(12) United States Patent
Kalluri et al.

(10) Patent No.: US 6,618,179 B2
(45) Date of Patent: Sep. 9, 2003

(54) MACH-ZEHNDER MODULATOR WITH INDIVIDUALLY OPTIMIZED COUPLERS FOR OPTICAL SPLITTING AT THE INPUT AND OPTICAL COMBINING AT THE OUTPUT

(76) Inventors: Srinath Kalluri, 22681 Oak Grove Ave, #325, Aliso Viejo, CA (US) 92656; Timothy A. Vang, 1004 Calle Carrillo, San Dimas, CA (US) 91773; David C. Scott, 11332 E. 214th St., Lakewood, CA (US) 90715

(*) Notice: Subject to any disclaimer, the term of this patent is extended or adjusted under 35 U.S.C. 154(b) by 0 days.

(21) Appl. No.: 09/931,136

(22) Filed: Aug. 16, 2001

(65) Prior Publication Data

US 2003/0128415 A1 Jul. 10, 2003

(51) Int. Cl.$^7$ ................................................ G02F 1/03
(52) U.S. Cl. ..................................................... 359/248
(58) Field of Search ................................. 359/248, 322, 359/323; 385/16, 27, 31, 48

(56) References Cited

U.S. PATENT DOCUMENTS 6,084,992 A * 7/2000 Weber et al. ............... 359/123
6,353,694 B1 * 3/2002 Paiam ......................... 385/129
6,421,155 B1 * 7/2002 Yano .......................... 359/156

* cited by examiner

Primary Examiner—Scott J. Sugarman
Assistant Examiner—Richard Hanig
(74) Attorney, Agent, or Firm—Parsons & Goltry; Robert A. Parsons; Michael W. Goltry

(57) ABSTRACT

Mach-Zehnder modulator with index tuned multimode interference couplers comprising a substrate, an optical input waveguide on the substrate for receiving a light signal, and an input multimode interference coupler. The input multimode interference coupler splits the received light and propagates it down two separate waveguides. Also, the input multimode interference coupler contains electrodes that allow the index of refraction to be tuned. These waveguides contain phase shift regions so that the light signals can be combined at the output multimode interference coupler out of phase. This allows the modulation of the light signal. Also, the output multimode interference coupler contains electrodes that allow the index of refraction to be tuned. The modulated light signal is then outputted through an output waveguide. The tuning of the index of refraction for the input and output multimode interference couplers eliminates the sensitivity of the areas to variations in their geometry.

21 Claims, 1 Drawing Sheet

MACH-ZEHNDER MODULATOR WITH INDIVIDUALLY OPTIMIZED COUPLERS FOR OPTICAL SPLITTING AT THE INPUT AND OPTICAL COMBINING AT THE OUTPUT

FIELD OF THE INVENTION

This invention relates to optical modulators.

More particularly, the present invention relates to Mach-Zehnder modulators.

BACKGROUND OF THE INVENTION

Electro-optic modulators and switches are important devices in integrated optical circuits such as fiber optic communication systems. A common optical switch is based on Mach Zehnder (hereinafter referred to as "MZ") modulators. These switches allow light to travel through the waveguide circuit and be reconfigured electronically at high speed and behave as the electrical to optical interfaces on the transmitter end of fiber optic links. MZ modulators are ideally built with III–V semiconductors, LiNbO$_3$, or optical polymers. In particular, MZ modulators are important because they can be integrated with other optical devices, such as semiconductor lasers, optical amplifiers, or other electronic circuits. High-speed modulators are an integral component in most optical networks currently deployed worldwide. However, the problem with semiconductor MZ modulators in the prior art is that they have a high insertion loss and a low throughput and are also expensive to manufacture. These devices are expensive and difficult to manufacture because of the high performance and tight manufacturing tolerances required for most commercial applications.

Semiconductor Mach-Zehnder modulators work by shifting the optical absorption edge of the semiconductor under the influence of an external voltage. The shift in absorption with voltage also implies a change in refractive index with voltage. For example, this refractive index variation can for a typical modulator geometry can described by Equation 1:

$$\Delta n = \frac{1}{2} n^3 r_{\it{eff}} \frac{V}{d'} \qquad (1)$$

where $\Delta n$ is the change in index of refraction, n is the index of refraction of the material, $r_{\it{eff}}$ is the effective electro-optic coefficient, V is the voltage applied across the electrodes, and d is the separation between the electrodes. Examples of materials that have large effective electro-optic coefficients are the III–V semiconductors, such as GaAs and InP (particularly when utilizing reduced dimensionality structures such as multiple quantum wells) and dielectric materials such as nonlinear polymers and LiNbO$_3$.

Semiconductor Mach Zehnder modulators typically consist of integrated optical waveguide circuits having a multiple quantum well (hereinafter referred to as "MQW") layer structure. Incident light is separated into individual branches at the input coupler. A voltage of opposite polarities can be applied at the phase shift regions to each individual branch to change the index of refraction of the waveguide, and, consequently, the speed of the light traveling through each waveguide. As a result, the phase of the light signal is increased in one branch and decreased in the other. When the resulting out of phase light signals are recombined at the output coupler, the resulting light signal will have its intensity modulated.

MZ modulators described in the prior art typically use either Y branches or multimode interference (hereinafter referred to as "MMI") couplers for both the input and output couplers. The problem with Y branch splitters is that small imperfections in the Y transition region can lead to very unequal 1×2 splitting. Equal power splitting and combining are particularly important for achieving modulators with high contrast ratios. 1×2 MMI couplers, however, always split the light signal equally and are ideally suited to be used as the input coupler. On the other hand, 2×1 MMI couplers at the output are very sensitive to reflections and must be manufactured to tight tolerances.

It would be highly advantageous, therefore, to remedy the foregoing and other deficiencies inherent in the prior art.

Accordingly, it is an object of the present invention to provide a new and improved Mach Zehnder modulator.

It is another object of the present invention to provide a new and improved Mach Zehnder modulator which has a more equal power splitting ratio.

It is further object of the present invention to provide a new and improved Mach Zehnder modulator which has a low insertion loss.

It is still a further object of the invention is to provide a new and improved Mach Zehnder modulator which allows the active tuning of the device performance.

A further object of the invention is to provide a new and improved Mach Zehnder modulator which has a high throughput.

A further object of the invention is to provide a new and improved Mach-Zehnder modulator which uses an external photodiode to monitor the optical output and uses the MMI coupler electrodes to provide feedback and actively control the insertion loss and contrast ratio of the device.

SUMMARY OF THE INVENTION

To achieve the objects and advantages specified above and others, an index tuned optical modulator apparatus is disclosed. The optical modulator includes light paths having phase shifting regions and an index tuned multimode light splitter including light input and output terminals. The light output terminals are connected to supply light to the light paths. Finally, a light output device is connected to receive light from the light paths and combine the received light at a light output terminal.

The index tuned MMI coupler is a MMI coupler positioned between electrodes so that an electric field can be applied and the index of refraction of the MMI coupler material can be controllably varied. By varying the index of refraction of the MMI coupler material, the effective length and width of the MMI coupler device can be controlled. This is important because the performance of an MMI coupler is extremely sensitive to the geometry of the device. In the priorart, variations in the device geometry caused the need to fabricate many devices. These devices would be tested until one was found that had the desired performance. This process is expensive and inefficient because many devices were being fabricated and tested and then were never used in actual applications.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the following drawings.

DETAILED DESCRIPTION OF THE PREFERRED EMBODIMENT

Figure 1:
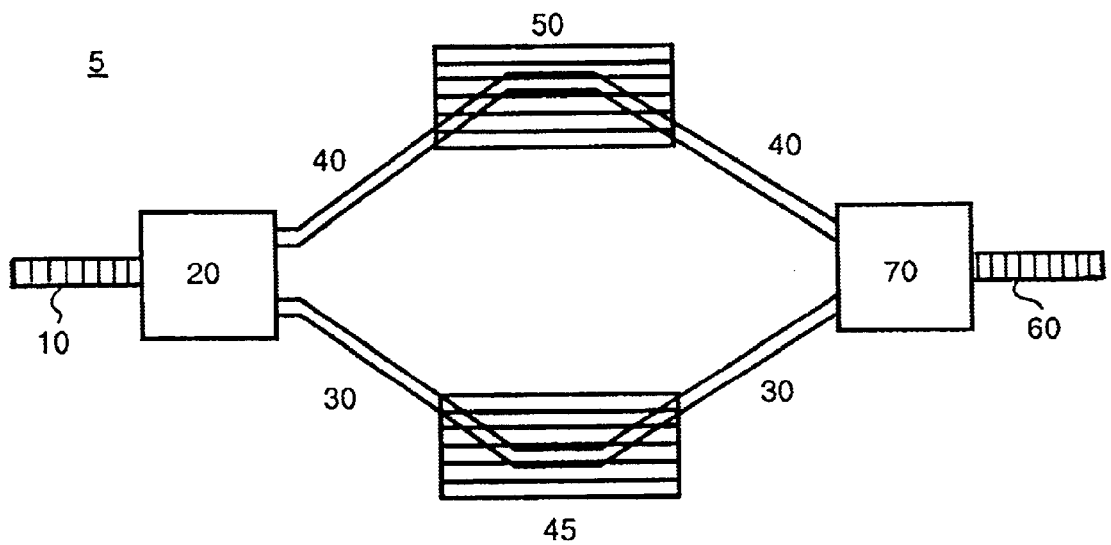
FIG. 1 is a simplified top plan view of a Mach-Zehnder modulator with index tuned multimode interference couplers at both the input and output.

Turn now to FIG. 1 which illustrates a top plan view of optical modulator apparatus 5. The illustration is not a complete design of an optical modulator and has been simplified to illustrate the important points. The illustration is also not to scale. Apparatus 5 contains an input light path 10 for receiving incident light. Input light path 10 is connected to an input optical coupler 20. In the preferred embodiment, the input optical coupler 20 includes either an index tuned multimode interference coupler or a multimode interference coupler. More information as to the index tuned MMI coupler can be found in a copending U.S. patent application Ser. No. 09/931,200 entitled "Index Tuned Multimode Interference Coupler" filed of even date herewith, and incorporated herein by reference. The input index tuned MMI coupler acts as a power splitter that evenly distributes the optical power between an optical light path 30 and an optical light path 40.

In this preferred embodiment, the index tuned MMI coupler contains electrodes that allow an electric field to be created within the pin region so that the index of refraction of this region can be tuned. It will be understood that the index of refraction can be tuned by other means, such as by using a resistive electrode heater that allows the index of refraction within the pin region to be changed by using thermal effects. The use of an electric field in this preferred embodiment is for illustrative purposes. Also, the index of refraction can be tuned by injecting a current into the MMI region and changing the index of refraction via the free carrier effect. However, this technique increases the loss and the MMI region would have to be electrically isolated from the phase shift regions.

This method improves the overall device yield and reduces the cost when compared to alternate designs and methods. The advantages of this method are a more uniform split ratio of the received light, when compared to other techniques such as using Y branch splitters and combiners. Equal power splitting and combining are particularly important for achieving modulators with high contrast ratios. However, the conventional MMI coupler's sensitivity to width variations places stringent requirements on the dimensions of the multimode region. It is known to those skilled in the art that the width of the MMI region must be controlled to within 0.3 $\mu$m in an InP MMI design to keep the insertion losses within acceptable limits. Moreover, MMI combiners of non-optimum widths and lengths are known to be sensitive to reflections. By tuning the index of refraction, these tolerances are relaxed.

The index tuned MMI coupler consists of an MMI structure between two electrodes. These electrodes can be used Lo apply a small DC voltage across the MMI region to tune its effective index slightly and thus compensate for manufacturing errors in it's width. Finally, these electrodes can also be used in MZ modulators to provide a feedback signal to actively stabilize the contrast ratio and insertion loss of the device.

In the preferred embodiment of the index tuned MZ modulator, the input coupler uses a 1×2 index tuned MMI coupler in order to achieve an equal light splitting ratio and the output coupler uses a Y branch combiner in order to minimize reflections at the output. In a preferred embodiment, the index tuned MMI coupler is comprised of a substrate material that is n-type doped InP. A subsequent InGaAsP quantum well structure is epitaxially grown on the InP substrate. A p-type InP layer is then epitaxially grown on the InGaAsP quantum well structures. The InP layer is then etched so as to form a light path to guide the light signal. The width of this light path defines the width W. The n-type doped InP substrate is subsequently lapped and an electrode is deposited thereon. Finally, an electrode is deposited on the p-type doped InP region. The n-type doped InP substrate, the InGaAsP quantum well's, and the p-type doped InP region form a pin diode structure.

Optical light path 30 and optical light path 40 guide the split light signal through a phase shift region 45 and a phase shift region 50, respectively. Phase shift region 45 and phase shift region 50 allow the application of voltages of opposite polarity. For example, if a positive voltage is applied to phase shift region 45, then the index of refraction of optical light path 30 directly beneath phase shift region 45 will decrease. Similarly, if a negative voltage is applied to phase shift region 50, then the index of refraction of optical light path 40 directly beneath phase shift region 50 will increase. Consequently, the light signal traveling through optical light path 40 and under phase shift region 50 will travel slower while the light signal traveling through optical light path 30 and under phase shift region 45 will travel faster.

Figure 2:
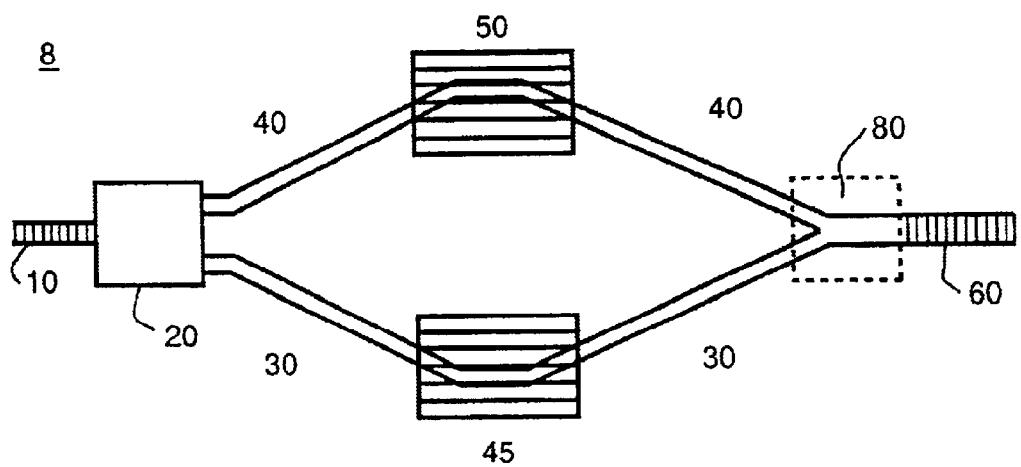
FIG. 2 is a simplified top plan view of another embodiment of a tuned Mach-Zehnder modulator.

The phase shifted light signals traveling through optical light path 30 and optical light path 40 are combined at an output optical coupler 70. In the preferred embodiment, output optical coupler 70 includes a Y branch combiner 80, as illustrated in FIG. 2. Y branch combiner 80 is used in place of output optical coupler 70 in order to minimize reflections at the output. It will be understood that output optical coupler 70 can also be an index tuned MMI coupler, similar to coupler 20. Since the light signals being combined at output coupler 70 are periodically in and out of phase, the outputted light signal is intensity modulated.

In the preferred embodiment, input optical coupler 20 is either an index tuned MMI coupler or a MMI coupler selected so that the received light signal is equally split. This is important so that the optical modulator apparatus 5 will have a high contrast ratio. By using an index tuned MMI coupler for input optical coupler 20, however, the insertion loss can be minimized and the throughput of the optical modulator apparatus 5 can be increased. Also, in the preferred embodiment, the output optical coupler is a Y branch splitter so that the reflections at the output are minimized.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. Index tuned optical modulator apparatus comprising:
    an optical modulator including a first light path having a first phase shift region and a second light path having a second phase shift region;
    an index tuned multimode light splitter including a light input terminal, a first light output, and a second light output, the first light output connected to supply light to the first light path and the second light output connected to supply light to the second light path; and
    a light output device connected to receive light from the first light path and the second light path and combine the received light at a light output terminal.

2. Index tuned optical modulator apparatus as claimed in claim 1 wherein the optical modulator consists of a Mach Zehnder modulator.

3. Index tuned optical modulator apparatus as claimed in claim 2 wherein the light output device includes a multimode interference coupler.

4. Index tuned optical modulator as claimed in claim 1 wherein the index tuned multimode light splitter has an internal light path with an index of refraction and apparatus that allows the index of refraction of the light path to be changed.

5. Index tuned optical modulator as claimed in claim 4 wherein the index of refraction of the index tuned multimode light splitter is varied by apparatus for creating an electric field created within the coupler.

6. Index tuned optical modulator as claimed in claim 4 wherein the index of refraction of the index tuned multimode interference coupler is varied by apparatus for injecting a current into the coupler.

7. Index tuned optical modulator as claimed in claim 4 wherein the index of refraction of the index tuned multimode interference coupler is varied by apparatus for heating the coupler.

8. Optical modulator comprising:

a substrate;

an input light path on the substrate for receiving a light signal;

an input optical coupler positioned on the substrate to receive the light signal from the input light path for splitting the received light signal;

a first optical light path and a second optical light path positioned on the substrate for receiving the light signal from the input optical coupler;

a first phase shift region and a second phase shift region positioned on the substrate and connected to the first optical light path and second optical light path, respectively, with each containing electrodes for applying a voltage to the first optical light path and the second optical light path; and a Y branch coupler positioned on the substrate for receiving the light signal from the first and second optical light paths for combining the light signal received from the and optical light paths and outputting a light signal.

9. Optical modulator as claimed in claim 8 wherein the input optical coupler is an index tuned multimode interference coupler and the output optical coupler is one of an index tuned multimode interference coupler and a multimode interference coupler.

10. Optical modulator as claimed in claim 8 wherein the input optical coupler is one of an index tuned multimode interference coupler or a multimode interference coupler and the output optical coupler and an index tuned multimode interference coupler.

11. Optical modulator as claimed in claim 8 wherein the input optical coupler is one of an index tuned multimode interference coupler and a multimode interference coupler and the output optical coupler is a Y branch optical coupler.

12. Optical modulator as claimed in claim 8 wherein the input optical coupler is a Y branch optical coupler and the output optical coupler is one of an index tuned multimode interference coupler and a multimode interference coupler.

13. Optical modulator as claimed in claim 8 wherein the light path contains an n-type doped InP substrate.

14. Optical modulator as claimed in claim 13 wherein an insulating InGaAsP quantum well layer is epitaxially grown on the n-type doped InP substrate.

15. Optical modulator as claimed in claim 14 wherein a p-type doped InP layer is epitaxially grown on the insulating InGaAsP quantum well layer and formed so as to define an optical light path.

16. Optical modulator as claimed in claim 15 wherein an electrode is deposited on the n-type doped InP substrate.

17. Optical modulator as claimed in claim 16 wherein an electrode is deposited on the p-type doped InP layer.

18. A method of modulating an optical signal comprising the steps of:

receiving an incident light signal;

sending the light signal to an input optical coupler and actively tuning the coupler for splitting the light signal substantially equally;

sending the split light signals into phase shift regions for changing the phase of the light signals; and receiving the light signals from the phase shift regions and combining them.

19. A method as claimed in claim 18 wherein the step of actively tuning the performance of the input optical coupler includes creating an electric field within the input optical coupler.

20. A method as claimed in claim 18 wherein the step of actively tuning the performance of the input optical coupler includes injecting a current into the input optical coupler.

21. A method as claimed in claim 18 wherein the step of actively tuning the performance of the input optical coupler includes heating the input optical coupler.

* * * * *